Dec. 18, 1923.    R. R. SHRIVER    1,477,982
ELECTRICAL HEATER
Filed Oct. 13, 1922
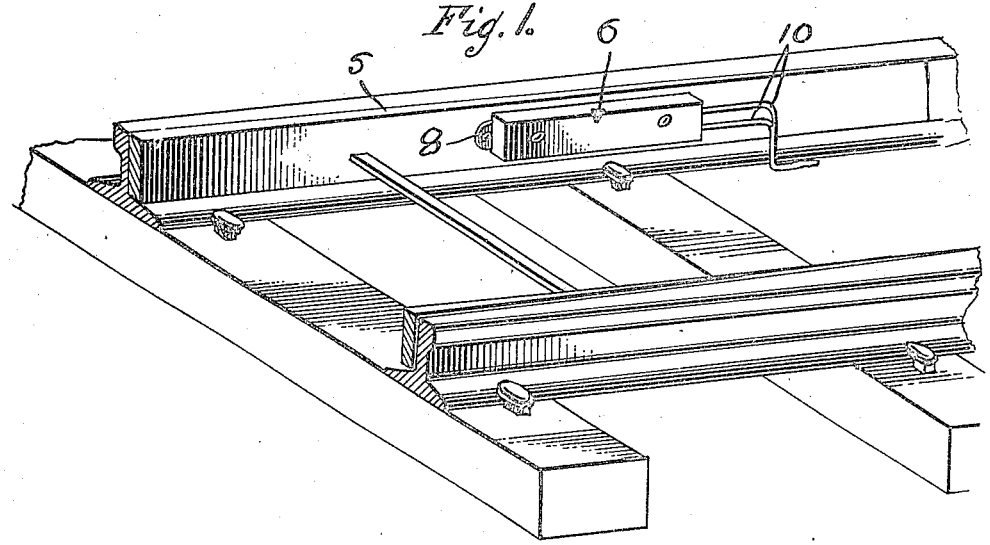
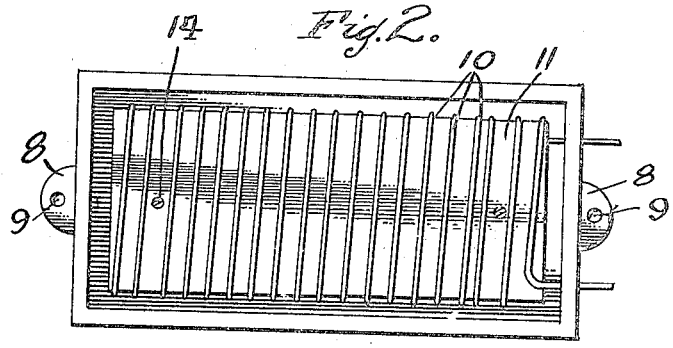
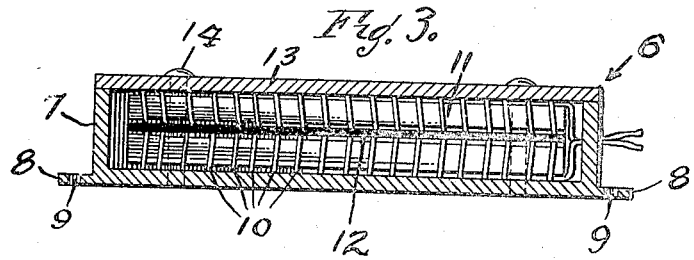
Inventor
R. R. Shriver.
By Richard B. Owen
Attorney
Witnesses.
J. H. Taylor,
Frank Fraser.

Patented Dec. 18, 1923.

1,477,982

UNITED STATES PATENT OFFICE.

RAY R. SHRIVER, OF RINARD, IOWA.

ELECTRICAL HEATER.

Application filed October 13, 1922. Serial No. 594,288.

*To all whom it may concern:*

Be it known that I, RAY R. SHRIVER, a citizen of the United States, residing at Rinard, in the county of Calhoun and State of Iowa, have invented certain new and useful Improvements in Electrical Heaters, of which the following is a specification.

My invention relates to improvements in electrical heaters, and has particular reference to a heater which is adapted to be used to melt snow and ice around switch and derail points, in railroad yards, and other places where switch and derail points are used, and which is so constructed that it may easily be applied and used, without interfering with the operation of a switch or derail point.

A still further object of my invention is to provide an electric heater, whereby switch and derail points may be kept free from snow and ice, without the necessity of stationing a man to pick the snow away, or pour hot water on the point, or other expensive manner of keeping the switch and derail points free to operate in the wintertime.

A still further object of my invention is to provide an electrical heater, that is adapted to melt snow and ice around switch and derail points, that is strong, durable, simple and inexpensive in construction, and that is well adapted to the purpose for which it is designed.

Other objects and advantages of the invention will become apparent during the course of the following description.

In the drawings, wherein like numerals designate like parts throughout the same, Figure 1 is a perspective view of a section of tracks, illustrating my invention in place, Figure 2 is a top plan view of my heater with the cover removed, and Figure 3 is a longitudinal section taken through the same with the cover in place.

In the drawings, wherein for the purpose of illustration is shown a preferred embodiment of my invention, the numeral 5 designates a rail switch.

The numeral 6 designates my electrical heater in its entirety, and comprises a suitable box 7, which is formed from any insulating material, having ears 8 formed on the bottom and extending therefrom a substantial distance, and an aperture 9 is provided in the ears 8, through which a bolt is passed, to mount the box in any desired place near the switch or derail points. A heating element is adapted to be placed within the box 7, and is formed by wrapping suitable wire 10 around an insulated block 11. I have found through experimentation, that it is practical to have two heating elements, as is clearly shown in Figure 3 of the drawings, separated by a piece of mica 12. The wires 10 pass through one end of the box 7, and are connected to any suitable source of electrical current. A removable lid 13 is held in place by means of bolts 14 passing through the lid 13, the insulating material 11 and 12, and fastened to the bottom of the box 7.

It will thus be seen, that I have devised a very simple form of heating element, that will require but very little electricity to heat the same, and which may be mounted in an out-of-the-way place on a switch or derail point, so as to sufficiently keep the switch or derail points free from ice and snow, as the action of the heating element will tend to melt the ice and snow therefrom.

It is to be understood that the form of my invention herewith shown and described, is to be taken as a preferred embodiment of the same, and that various changes in the shape, size and arrangement of parts may be resorted to, without departing from the spirit of my invention or the scope of the subjoined claim.

Having thus described my invention what I claim as new is:—

An electric device for heating switch points and other railroad appliances comprising a casing having one end open, attaching ears formed on the casing to permit the securing of the casing in place, a pair of facing insulated blocks disposed in the casing, a wire coiled around one block and then around the other blocks, a strip of mica interposed between the blocks, a cover for the open end of the casing, and securing elements extending through the casing, cover and insulating blocks for holding the heater in its assembled form.

In testimony whereof I affix my signature in presence of two witnesses.

RAY R. SHRIVER.

Witnesses:
  A. J. SHRIVER,
  F. A. SIMPSON.